United States Patent [19]

Minshull et al.

[11] 3,771,142

[45] Nov. 6, 1973

[54] DIGITAL DATA STORAGE SYSTEM

[75] Inventors: John F. Minshull, Winchester; Alan S. Murphy, Chandler's Ford, both of England

[73] Assignee: International Business Machines Corporation, Armonk, N.Y.

[22] Filed: May 1, 1972

[21] Appl. No.: 248,835

[30] Foreign Application Priority Data

May 5, 1971 Great Britain .................. 13,265/71

[52] U.S. Cl. ........................ 340/172.5, 340/173 AM

[51] Int. Cl. .......................................... G11c 15/00

[58] Field of Search ............... 340/174 SR, 173 AM, 340/172.5

[56] References Cited

UNITED STATES PATENTS

| | | | |
|---|---|---|---|
| 3,344,402 | 9/1967 | Foulger et al. | 340/172.5 |
| 3,465,303 | 9/1969 | Koerner | 340/173 |
| 3,473,156 | 10/1969 | Couleur et al. | 340/172.5 |
| 3,508,220 | 4/1970 | Stampler | 340/174 |
| 3,512,134 | 5/1970 | Packard | 340/172.5 |
| 3,546,677 | 12/1970 | Barton et al. | 340/172.5 |
| 3,553,653 | 1/1971 | Krock | 340/172.5 |
| 3,614,746 | 10/1971 | Klinkhamer | 340/172.5 |
| 3,648,254 | 3/1972 | Beausol et al. | 340/172.5 |

OTHER PUBLICATIONS

G. A. Blaauw & J. A. Shelly, IBM Technical Disclosure Bulletin, "List Searching Procedure," Vol. 9, No. 8, Jan. 1967, pp. 981–2.

*Primary Examiner*—Paul J. Henon
*Assistant Examiner*—James D. Thomas
*Attorney*—William S. Robertson et al.

[57] ABSTRACT

Storage space in an associative store is freely allocated between a plurality of I/O devices. Initially, each register of the store contains a number belonging to a cyclic number sequence. A number is erased when data is entered into a register and the highest (taking wrap around into account) unused number is placed in a register when data is removed. Data associated with a given device is tagged with the device address and can be stored in first-in first-out or last-in first-out modes. In an alternative embodiment when sufficient data has been accumulated from a device, it is labelled as a data block. Data blocks can be transferred from the store in priority order determined either by the associated device and/or the content of the block.

9 Claims, 7 Drawing Figures

United States Patent [19]
Minshull et al.
[11] 3,771,142
[45] Nov. 6, 1973
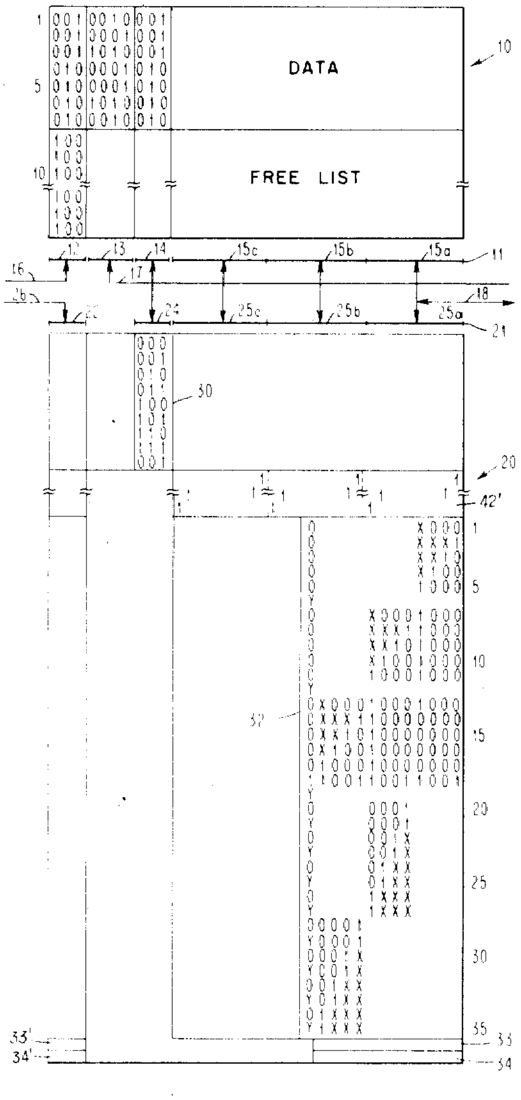

DIGITAL DATA STORAGE SYSTEM

THE INVENTION

This invention relates to a digital data storage system using an associative store.

According to the invention, a digital data storage system includes an associative store comprising associative registers suitable for the storage of data items, wherein in operation registers not in use for the storage of data items are identified by sequential numbers belonging to a cyclic number sequence of length equal to the number of registers in the store, a different number being stored in each register not storing a data item, and the system comprising means for storing in a register from which a data item is unloaded, before a further data item is unloaded from the store, the number next in the cyclic sequence to the last sequential number.

The invention provides an inexpensive and easy way of using to full capacity an associative store.

Preferably, the invention is embodied in a buffer system for temporarily storing data in transit between a plurality of devices. Data associated with each device is unloaded from the store in the order in which the data was loaded (first-in first-out). Only as much storage space is used by a device as is needed by the device. This contrasts with known systems in which a fixed amount of storage is preassigned to a device irrespective of whether the space is actually needed Such storage assignments are ordinarily calculated to meet "worst case" requirements, not the minimum working requirements.

In a modification of the invention as it has been described so far, as soon as a given number of words associated with a device have been loaded in the store, the words are labelled as a "data block." Data blocks are unloaded from the store in the order in which they are labelled. Provision is made for data blocks associated with certain devices to be given a higher priority than the remaining blocks so that the high priority data blocks are unloaded before the rest.

The description and claims defining the invention contain references to "number sequences" and "incrementing." These terms are defined for the purpose of this specification as follows:

A number sequence is an ordered set of bit patterns $a(1), a(2), \ldots, a(n-1), a(n)$. The next bit pattern to $a(i)$ is $a(i+1)$. In a cyclic number sequence, the next bit pattern to $a(n)$ is $a(1)$. Incrementing is the operation of transforming a bit pattern into its next bit pattern. Bit patterns are called "numbers."

It should be noted that it is irrelevant that the bit pattern has a numeric significance. When the $a(i)$ are binary representations of integers and $a(i+1) = a(i) + 1$, incrementing has its usual meaning. If, in this case, $a(i+1) = a(i) - 1$, incrementing according to the definition covers decrementing as usually understood. An example of a non-numerically significant sequence is given in the description.

THE DRAWINGS

Figure 3A:
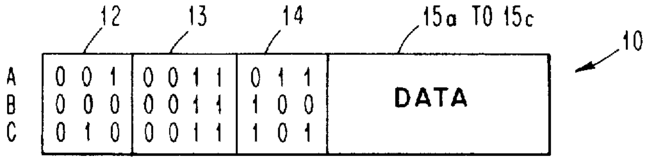
Figure 3B:
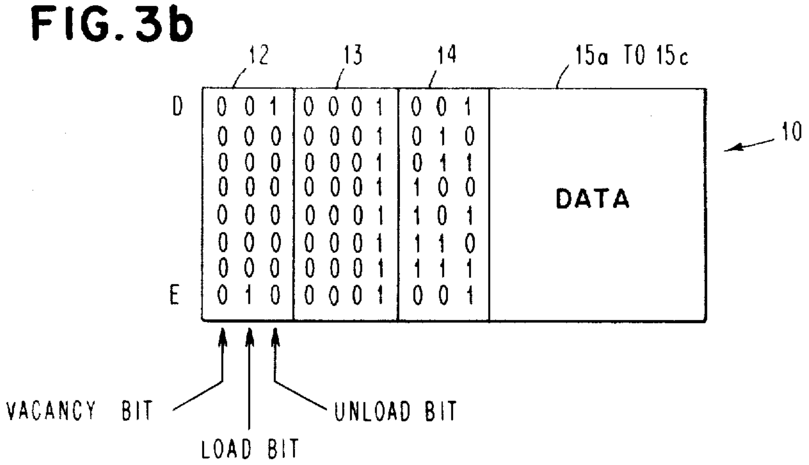
Figure 4A:
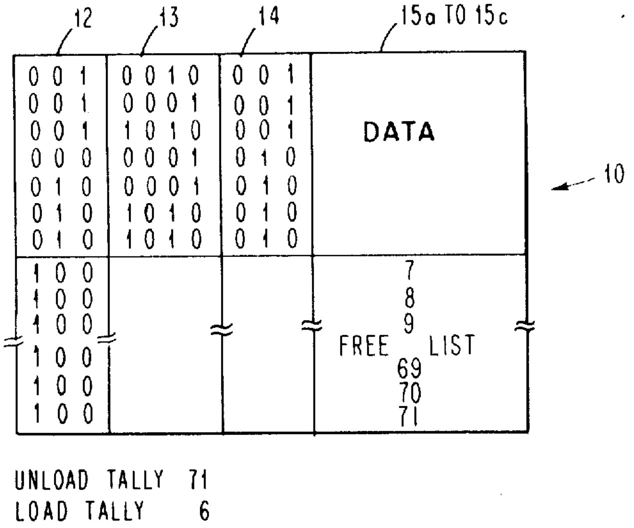
Figure 4B:
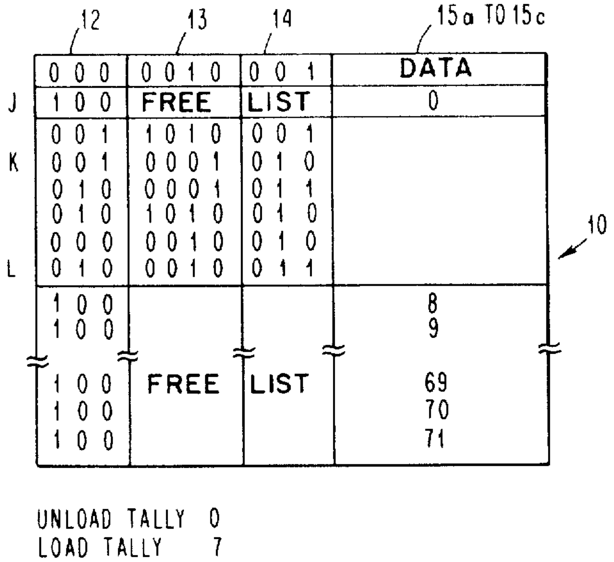

FIGS. 3*a* and 3*b* illustrate the allocation of buffer space to a terminal;

FIGS. 4*a* and 4*b* illustrate the use of load and unload tallys; and

Figure 1:
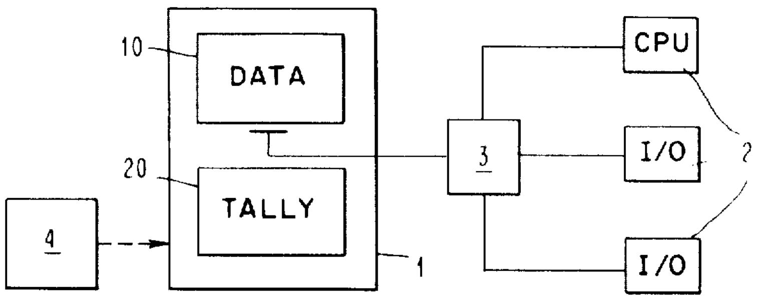
FIG. 1 is a block diagram of a data processing system using a data storage system according to the invention.
Figure 5:
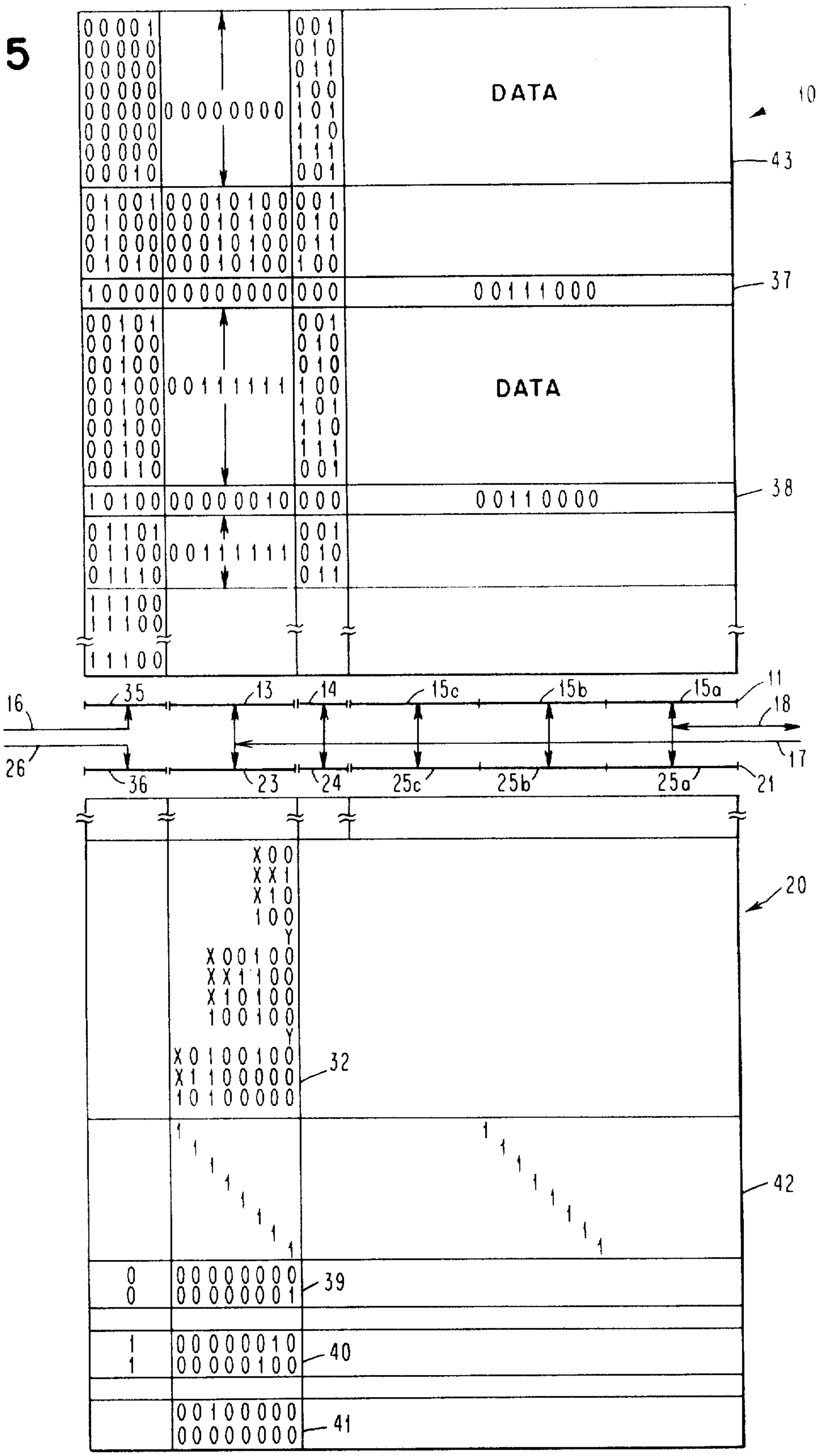

FIG. 5 is a block diagram illustrating the arrangement and typical store content of a modification of the system of FIG. 1.

THE SYSTEM OF FIG. 1

Referring to FIG. 1, a digital data storage system 1 according to the invention preferably is used as a buffer storage system for a plurality of data handling devices 2. These devices as shown include a CPU and I/O device of a data processing system. Connection between devices 2 and storage system 1 is made through a known switching system 3, such as is found in many large data processing systems to control which data transfers can take place at any time. In certain applications, when for example, I/O devices 2 are telecommunication terminals, a direct connection can be provided from the CPU to storage system 1, and switching system 3 could be a line multiplexer. Control of the storage system 1 preferably is provided by a microprogram control store 4 of any suitable construction. A fuller description of the control functions required is given later. Store 4 can be integrated with the CPU control to form part of the control of the whole system shown in FIG. 1. The storage system 1 according to the invention preferably comprises two associative stores, a data store 10 and a tally store 20.

Two embodiments of the storage system of this invention will be described. The first system comprises an associative store in which storage space in store 10 up to a given limit can be assigned to each and any of a plurality of devices as and when the need arises. As is conventional, the storage space used by a particular device will be called a buffer. The second embodiment is a modification of the first in that should a device require storage space in excess of a single buffer, a new buffer is created for the device.

THE STORAGE SYSTEM OF FIG. 2

Figure 2:
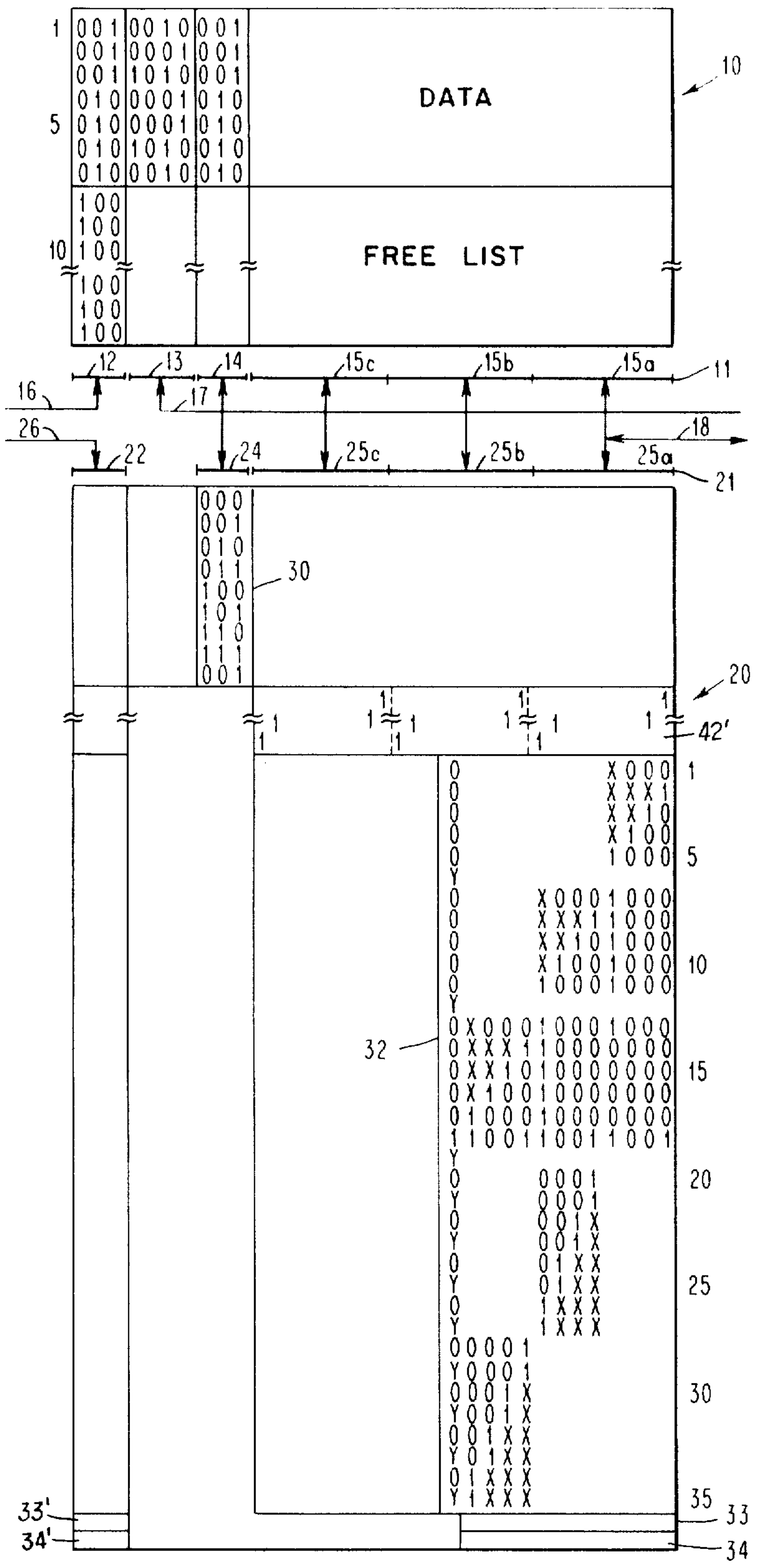
FIG. 2 is a block diagram illustrating the arrangement and typical store content of a data storage system according to the invention.

Referring now to the storage system of FIG. 2, which shows the first system referred to above, an associative data store 10 and an associative tally store 20 have respective input/output registers 11 and 21 which are subdivided into fields defined by the nature of the contents of the respective stores and by the interconnections of the registers to other components of the system. Register 11 has a control field 12, and identifier field 13, a sequence field 14 and a data field 15. Field 15 is subdivided into fields **15*a*, 15*b* and 15*c* called the byte 1, byte 2 and byte 3 fields. Similarly, register 21 has a control field 22, a sequence field 24, and byte 1 to 3 fields 25*a* to 25*c*. Note that there is no identifier field in register 21. Fields 12 and 22 are connected to receive signals over lines 16 and 26 respectively from a control source which may be microprogram control store 4 of FIG. 1. Indentifier field 13 is connected over line 17 to a number source (not shown) which generates a number string which labels an item of data as being associated with a particular device. The number string can be an address by which the device is identified. How the number source operates is not relevant to the invention and further description is not necessary since labelling techniques are well known. Sequence fields 14 and 24 of registers 11, 21 are interconnected and subfields 15*a*, 15*b*, and 15*c* are connected in corresponding pairs to fields 25*a*, 25*b*, and 25*c***.

Fields 15a and 25a are also connected over a common line 18 to sources and sinks of data. These sources and sinks may for example, comprise the main store of a data processing system and a plurality of input/output devices such as disc files, tape reels and telecommunications lines all multiplexed onto line 18.

In the embodiment of FIG. 2, an item of data to be transferred between devices 2 of FIG. 1 is three bytes of data, and line 18 carries one byte of data at a time. Store 20 has a field 42' for producing a shift to the right in fields 25a, 25b, 25c for transferring bytes stored originally in fields 25b, 25c to line 18. While an item of data is being presented to the buffer store system 1 over line 18, the item label is maintained on line 17.

The associative stores 10 and 20 are preferably of the kind described in U. S. Pat. No. 3,609,702, assigned to the assignee of this application. In a search operation in store 10, a search argument in a selected field (the search field) of the store input/output register 11 is compared with the contents of the same field of all the word registers of the store. Where the contents of a word register and the search argument match, a selector trigger is set which marks the register for accessing in subsequent Read or Write operation. A match may occur at more than one location. A Read operation causes the simultaneous read out to input/output register 11 of the contents of a selected field (the read/write field) of all word registers marked by the selector triggers. A Write operation causes the contents of the read/write field of the input/output register simultaneously to be written in all word registers of the store with set selector triggers. Also provided in the associative stores 10, 20 is the Next operation, which can be combined with a Search operation, in which the selector triggers are treated as a shift register and are given a one stage shift. The effect of the Next operation is to mark for accessing the word registers next to the word registers marked at the beginning of the operation. An operation Search Next results in the accessing of word registers next to those registers containing data matching the search argument. The data storage cells of stores 10, 20 have four stable states, two states representing binary 1 and 0 and two states designated X and Y. The X state is such as not to give a mismatch on a Search, and is read as binary 0. The Y state always gives a mismatch on a Search, so that a register with cells in the search field set to Y can only be accessed by a Next operation. The Y state is also read as binary O. Suitable cell constructions are described in U. S. Pat. No. 3,543,296 assigned to the assignee of this application.

In the figures, word registers are not shown in circuit schematic form, rather their contents are represented as horizontal lines of characters each representing the state of a data storage cell. Unless the context otherwise requires, the absence of a character signifies that a cell is in the X state which does not take part in a search operation.

Referring to the data store 10, the word registers of the store can be either in use, i.e., holding data items, or on the free list, in which case the register is available for receiving data.

In FIG. 2, word registers or lines 1 to 7 of store 10, are in use and the remaining lines are on the free list. As will become clear from the subsequent description of the free list, the lines in use and on the free list can be interspersed among each other and not necessarily, as shown, in separate blocks of the store. FIG. 2 shows, in fact, an early stage in the use of the buffer system before all lines of the store 10 have been used once.

THE BUFFER ORGANIZATION OF FIGS. 3a and 3b

FIGS. *3a* and *3b* show how typical buffers are organized. The figures do not represent blocks of the data store 10 but the contents of the lines of store 10 comprising a single buffer. Since store 10 is associative, the lines can be located anywhere in the store. For example, the three lines A, B, and C of FIG. *3a* could be in word registers 19, 7 and 11 respectively of store 10, using the numbering system indicated to the left of store 10 in FIG. 2. In FIGS. *3a* and *3b*, the fields of store 10 already described have the same references as in FIG. 2. Each item of data is identified as belonging to a given buffer by the identifier in field 13 and in the example of FIG. *3a*, the buffer is made up of storage locations having the identifier 0011. The position of an item of data in the buffer is given by a sequence number in the sequence field 14. Thus, the entries A, B, and C in FIG. *3a* have the decimal sequence numbers 3, 4, and 5 respectively. The buffer operates on the first-in, first-out principle and the next item to be removed is identified by an unload marker which is a 1 bit in the rightmost column of the three column control field 12. Thus, in FIG. *3a* only item A has this identifying bit and it is the next item to be removed from the buffer. The last item stored in the buffer is identified by a load marker which is a 1 bit in the center column of control field 12. The left hand column of the control field stores a 0 for indicating that a word register is in use as a buffer and it stores a 1 for indicating that the register is on the free list.

The sequence number of field 12 is used for removing data from a buffer in the order in which it was loaded. When data is loaded into a buffer, the sequence number of the data entry marked by the load marker is found and this number is incremented. The incremented sequence number, together with a new load marker, is placed in the sequence field of the line into which the data is being loaded. The old load marker is erased. When data is unloaded from a buffer, the sequence number of the unloaded data is incremented and the data with the incremented sequence number is given the unload marker. Sequence numbers are cyclically incremented: the increment of the highest number of the sequence gives the lowest number of the sequence. It will be noted that the absolute value of a sequence number is not significant, since it is used only to indicate a relative order of loading and unloading.

FIG. *3a* shows a typical buffer associated with the device identified by an address 0011. Line A is the next to be unloaded since it has an unload marker. When line A is unloaded, the marker will be placed in line B, the line with the next highest number in the binary counting sequence. The last line to be loaded was line C since it has a load marker. The next line to be loaded will have a sequence number 110, the sequence number of C incremented.

Sequence numbers are also used to determine when a buffer is full. The length of a sequence is chosen to be one less than the capacity of a buffer. Thus, for a binary counting sequence, the length is 2, 4, 8 or 16, etc. FIG. *3b* shows a full buffer with a capacity of eight lines of the store, 24 bytes of data stored three bytes to a line. The sequence consists of seven numbers, binary 001 to binary 111, and when a buffer is full, the data with the load marker and the data with the unload marker have the same sequence number. For example, in FIG. 3b, register D contains the unload bit and the binary sequence number 001 (decimal 1); register E contains the load bit and it also has the sequence number 001. A check whether a buffer is full is made whenever it is required to load data into a buffer. Using the buffer of FIG. 3b as an example, the first store cycle on a data load operation would include a search on control field 12 = 010 for the last item stored and identifier field 13 = 0001 read operation identifier would follow on field 13 and sequence field 14. The input/output register at the end of the cycle holds the value 0001 in field 13 and the value 001 in field 14 since line E is selected by the search. The second store cycle is search on field 13 = 0001 and field 14 = 001 and a read operation on field 12. This operation selects both lines D and E and at the end of the cycle, the input/output register holds in field 12 the value 011. The presence of the unload marker in the output register indicates that the buffer is full.

If a buffer is full, it is possible that all that is necessary is that the data to be loaded is held in the output register of the device by which it was supplied until data is unloaded from the buffer. This is not always a satisfactory solution and FIG. 5 shows a system in which a new buffer is created while retaining the order of loading and unloading words into the buffer or buffers associated with a device.

OPERATIONS ON THE DATA STORE

Referring again to FIG. 2, as has been mentioned, every word register of the data store 10 is either in use as part of a buffer or is on the free list. Loading data into a buffer involves selecting a register on the free list and allotting it to the buffer, while unloading data from a buffer involves returning the register from which the data is taken to the free list. FIG. 4a represents the contents of data store 10 having by way of example, 72 lines, soon after the buffer system has been started. Seven lines have been loaded, two each from a device identified by 0010 and 1010, respectively, and three from a device identified by 0001. Three buffers have been formed. Fields 15a to 15c of the seven lines contain data. The remainder of store 10 is on the free list. Lines on the free list are distinguished by a one bit in the left-most column of control field 12. A record of which lines store data and which are on the free list is maintained by means of load and unload tallys. As will be explained when operation of the system of FIG. 2 is described, load and unload tallys are stored in register 33 and 34 of tally store 20. A register 33, 34, is addressed by a key supplied on line 26 to match one of the identifying entries stored in locations 33', 34' of field 22. Initially every line of the store 10 is identified by a number in the range 0 to 71. Which number is allocated to which line is unimportant since store 10 is associative but it is convenient for loading purposes to order the lines sequentially, from top to bottom of the store as shown in FIG. 4a. The number identifying a line is stored in the data field of the line. Accordingly, the top most line of store 10 contains the number 0, and the bottom line of the store 10, the number 71. Load and unload tallys are initially both the number 71. When it is required to load a word into store 10, the load tally is examined, tested against the unload tally, incremented and used to select the line of store 10 on the free list and having in the data field the same number as the load tally. The test against the unload tally is to determine whether the store is full or empty. Assuming store 10 to be empty, with numbers 0 to 71 written into the data fields 15a to 15c, and the left hand column of control field 12 of each line containing a binary one, the procedure is as follows:

1. The load tally is retrieved and compared with the unload tally. Since they are both 71, this shows that the store is either full or empty. A search is then made on the left most column of control field 12 and it is found to contain at least one binary one so the store is known to be empty.
2. The load tally is incremented from 71 to 0.
3. A search is made for the line containing zero in the data field — in this case the topmost line of the store — and the word to be stored is written into the line at the same time as the vacancy bit is changed to zero.

FIG. 4a shows the state of store 10 after seven words have been loaded and none unloaded. The unload tally remains at 71, whereas the load tally is now six (for the seven lines, zero through six, that have been loaded). Assume that it is required to unload a word from the buffer associated with device 0001. A search is made with search argument 0001 in field 13 and 001 in field 12. Line J (FIG. 4a) is selected, and the data unloaded from fields 15a to 15c. The unload tally is retrieved and incremented changing it in the example from 71 to 0. Line J is again accessed using fields 12 and 13 as search argument and the incremented unload tally is written into the data fields 15a to 15c. Simultaneously, the contents of field 12 of line J are changed to 100. To complete the operation, the unload marker is written into the next higher sequenced word of the buffer, in this case into line K. The effect of the unload operations is to make line J of store 10 available for the storage of data. Consideration of the way the load and unload tally are used shows that line J will not be used until all the words on the free list at the beginning of the unload operation have been used. But the procedure described does ensure that a line of the store is available as soon as it is unloaded. Line J is loaded next after the line with address 71 irrespective of whether any intervening line in FIG. 4b, the topmost line of the store 10, is used or unused. If the rate of loading and unloading is approximately the same for all devices, the effect of the load and unload tallys is to move the free list cyclically about the store. If, for example, about 50 lines are in use at any time, the free list initially comprises the fiftieth to seventy-second line. A little later, it comprises the sixtieth to seventy-second line and the first to tenth lines, and later still, the tenth to thirtieth lines. On the other hand if some devices are such that data associated with these devices stays a longer time in the store than the remaining data, there is a slow cyclic movement through the store of the buffers allotted to these devices together with a much faster cyclic movement of the buffers allotted to the remaining devices.

INCREMENT TABLE 30

The increment tables for the buffer word sequence numbers and the load and unload tallys are shown in FIG. 2. Tally store 20 holds both the sequence increment table 30 and the tally increment table 32.

Considering first the sequence increment table 30, it will be recalled that an unassigned buffer word contains the binary value 000 in field 14. When a buffer word is assigned to a device the value to be loaded into field 14 is one greater than the value in field 14 of the word previously assigned to the device, or, if it is the first word to be assigned to the device, the value 001. The capacity of a buffer is eight words but, since when the buffer is full the sequence numbers are equal, only seven values are required for field 14. The increment table occupies field 24 of tally store 20, which is connected directly to field 14 of the data store 10, and consists of nine lines of three bits each. In the first eight lines the binary values 000, 001, 010 to 111, are respectively stored. The ninth line contains the value 001. The table is designed to be used in a store cycle in which the operations Select, Next, Read, are performed using field 24 both as the search and read field. At the beginning of a cycle, the search argument in field 24 of register 21 is what was retrieved from field 14 of the data store 10 during the previous cycle. At the end of a cycle, the contents of field 24 and thus of field 14 of the input/output register of data store 10 are the sequence number to be placed in the assigned buffer word. If no word has previously been assigned to the device requesting a buffer word location, the search argument is 000 and the next word of the table is retrieved to obtain 001 as the sequence number. Other search arguments result in an output of the search argument incremented by one. Note that the value 111 is incremented to 001 and that a subsequent search argument of 001 results in an output of 010 in spite of two lines of the table being selected. This is due to the fact that the selected lines are ORed together and the line following the ninth line of the table contains in field 24 only X-state cells which are read as zeroes.

TALLY INCREMENT TABLE 32

The load and unload tally increment table 32 is constructed on a different principle than sequence increment table 30. Since store 10 is arranged to hold several buffers, the load and unload tallys can take values which lie in a larger range than the sequence numbers. A typical data store 10 can have about 70 word registers. Although a tally increment table for incrementing from 0 to 70 can be designed which does not require too much storage space, such a table is complex to use since it requires different numbers of storage cycles in accordance with the amount of carry propagation needed. It is of course possible to construct a table like table 30 but the amount of storage space needed is inordinately large. To avoid these difficulties, use has been made of the fact that data store 10 is associative so that it is unnecessary to identify the word registers of the data store by an ordered list of numbers. All that is required is a different bit pattern to identify each word register. Tally increment table 32 is designed to produce a sequence of bit patterns such that the use of a bit pattern of the sequence as a search argument results in the output of the next bit pattern of the sequence. A bit pattern has no numerical significance. It should be noted that in our description of the load and unload tallys we used decimal numbers, and referred to incrementing these numbers. Although this was principally to make the explanation of the tallys easier, such a method of identifying the free list is not precluded by our choice of non-numeric identifiers in our preferred embodiment.

Referring to table 32 of FIG. 2, it is intended to be used with a store cycle of Search, Next, Read, with a search argument comprising the current load or unload tally. Both of the load tally and the unload tally are incremented in the same way by the same table. Because the operations on table 32 of store 20 do not change the contents of the table, the same table is used for forming both the load tally, and the unload tally. The tally is read from a word register 33 of store 20 (for the load tally) or from word register 34 of store 20 (for the unload tally). This operation produces the incremented load or unload tally as an output of the table. Incremented is here used to refer to the bit pattern next in sequence to the bit pattern comprising the search argument. The lines of the table are numbered at the right hand side. The following tabulation illustrates how the table 32 emits a bit pattern sequence starting from an initial all zero search argument.

An example of the operation described by the table will be given following the table.

| Sequence No. | Selected Line | Lines Read | Output Bit Pattern |
|---|---|---|---|
| 1 | 1 | 2 | 0 0000 0000 0001 |
| 2 | 2 | 3 | 0 0000 0000 0010 |
| 3 | 3 | 4 | 0 0000 0000 0100 |
| 4 | 4 | 5 | 0 0000 0000 1000 |
| 5 | 1,5,7 | 2,6,8 | 0 0000 0001 1001 |
| 6 | 2,20 | 3,21 | 0 0000 0001 0010 |
| 7 | 3,20 | 4,21 | 0 0000 0001 0100 |
| 8 | 4,20 | 5,21 | 0 0000 0001 1000 |
| 9 | 1,5,8,20 | 2,6,9,21 | 0 0000 0011 1001 |
| 10 | 2,22 | 2,23 | 0 0000 0010 0010 |

And likewise until

| Sequence No. | Selected Line | Lines Read | Output Bit Pattern |
|---|---|---|---|
| 20 | 4,26 | 5,27 | 0 0000 1000 1000 |
| 21 | 1,5,7,11, 13,26 | 2,6,8,12, 14,27 | 0 0001 1001 1001 |
| 22 | 2,28 | 3,29 | 0 0001 0000 0010 |
| And likewise until | | | |
| 100 | | | 0 1000 1000 1000 |
| 101 | 1,5,7,11, 13,17,26, 34 | 2,6,8,12, 14,18,27,35 | 1 1001 1001 1001 |
| 102 | 18 | 19 | 0 0000 0000 0000 |

Thus completing the cycle. The first line of the table represents the operation on store 20 when the load or unload tally has been set to its initial value of 0 0000 0000 0000. When this tally value is used as a search argument, line 1 in table 32 is selected. The store is provided with the Next feature, and the read operation following this search operation is directed to line 2 of table 32 and the store produces the output 0 0000 0000 0001, as the table shows for sequence 1 in this incrementing operation. Similarly, using the current tally formed in step 1 of the sequence, the search operation selects line 2 of store 32 and in the following read operation, line 3 of store 32 is read to produce the current tally 0 000 000 0010, as shown in the table for step 2 of the sequence. With step 5 in the sequence, the current tally produces multiple matches in lines 1, 5 and 7 of store 32 and a multiple read operation occurs at line 2, 6 and 8 to produce the OR logic function of the data stored in these lines. The operation continues in this way, producing one of two patterns in repeating sequence without the more complex logic operation required for a conventional incrementing operation.

By suitable modifications, a table giving a cyclic sequence of any length can be designed, using the approach of table 32. Since the assumption is that the data store has about 70 lines, the full table shown and described above would not be used.

OPERATION

We now describe the load and unload sequences, cycle by cycle of operation of the stores. It will be understood that the data store 10 and tally store 20 operate in synchronism controlled by an external clock (not shown), that the search and read or write fields are defined by conventional masking which is externally controlled, and that the data on lines 16 and 26 are also supplied by an external control. This external control could take the form of a microprogram control store transmitting to each store 10 and 20 two control words for each cycle of the data and tally stores. Each control word would contain data defining the store operation to be performed in the phase of store cycle to which the word relates and the field over which the operation is to be performed. In the present state of the microprogram and decoder art such control is conventional and will not further be described.

Unload Buffer Word (Device number is supplied on line 17).

Cycle 1

Tally Store 20: No operation.

Data Store 10: Search over field 13 for device number and over field 12 for unload flag. Read data from the selected word and load into fields 15*a* to 15*c* of input/output register 11.

Comments: The word least recently stored and associated with the device is selected. The contents of field 15*a* are now on line 18. Fields 15*b* and 15*c* are now available in fields 25*b* and 25*c* of the input/output register of store 20.

CYCLE 2

Tally Store 20: Search on fields 25*b* and 25*c* in the shift table. Read on fields 25*a* and 25*b*.

Data Store 10: No operation.

Comments: Data in fields 25c and 25b of register 21 has been shifted one field to the right. Field 15*b* of the word selected from store 10 is now available from field 25*a* on line 18.

CYCLE 3

As for cycle 2. Field 15*c* is now available on line 18.

CYCLE 4

Tally Store 20: Search over field 22 using the key for unload tally register 34. Load unload tally into fields 25*a* to 25*c*.

Data Store 10: No operation.

CYCLE 5

Tally Store 20: Using tally increment table 32, increment the current unload tally which is held in fields 25*a* to 25*c*.

Data Store 10: Searching on the device number and the unload flag, write the buffer sequence number of the unloaded register and load it into field 14 of register 11 and field 24 of register 21.

Comments: Incremented unload tally is in fields 25*a* to 25*c*. Buffer sequence number of the word just unloaded is available in field 24.

CYCLE 6

Tally Store: Maintain unload tally in fields 25*a* to 25*c*. Increment buffer sequence number using sequence table 30.

Data Store 10: Select for the unloaded register on device number on line 17 and unload flag. Write incremented unload tally from fields 25*a* to 25*c* into fields 15*a* to 15*c* and write 100 into field 12.

Comments: Incremented buffer sequence number is available in field 14. The word from which data has just been unloaded is now on the free list.

CYCLE 7

Tally Store 20: Using the unload tally key in field 22, write the incremented unload tally into register 34.

Data Store: Select on device number and buffer sequence number. Write the unload flag into the field 12 of the selected word.

Seven cycles are thus necessary for a typical unload sequence of three data bytes. It is possible that a buffer word could have both load and unload flags. This occurs when the buffer word is the last remaining of a group of words associated with a given device. In such a case the unload sequence is slightly modified, although not shortened, in that is is unnecessary to increment the buffer sequence number. Detection of this possibility is by searching for a load flag and, if found, reading it to external control on cycle 1 of the data store. This enables a branch to the appropriate microprogram routine.

Load Buffer Word (Device number available on line 17.)

CYCLE 1

Tally Store 20: Read load tally from register 33.

Data Store 10: Search on device number and the load flag. Read buffer sequence number and load flag.

Comments: The load tally is obtained to determine the next word register on the free list. A search is made for the last word loaded in the buffer to determine the sequence number to be allotted to the word being loaded. If a load flag is not found, a buffer for the device does not exist and external control branches on this indication to a slightly modified routine.

CYCLE 2

Tally Store 20: Using the load tally, search the unload tally.

Buffer Store 10: Search for the buffer sequence number in combination with the device number and an unload flag.

Comments: If the load tally retrieves the unload tally it is known that the data store is full for the load tally is equal to the unload tally. The store cannot be empty for it is assumed that a load flag has been found on the previous cycle. Similarly, if the buffer sequence number is found in combination with an unload flag, the buffer allotted to the device is full. In either case the sequence is stopped. A short wait is usually sufficient to clear either condition.

CYCLE 3

Tally Store 20: Increment load tally using table 32. Increment sequence number using table 30.

Data Store 10: Search on device number and load flag. Write 000 in field 12.

Comments: The increments in the tally store can take place simultaneously since they use different fields of the store but the same store operations, Search, Next, Read. In the data store the load flag has been removed from the last word loaded into the device buffer.

CYCLE 4

Tally Store 20: Write the incremented load tally into register 33.

Data Store 10: Select on the incremented load tally and on the free list flag (field 12 = 100) the next word register on the free list. Write into this register incremented buffer sequence number in field 14, the device identification in field 13 and 010 into field 12.

CYCLE 5

(It is assumed that data is available on line 18)

Tally Store 20: Shift data on line 18 by way of field 25*a* and the shift table 42' to field 25*b*.

Data Store 10: No operation.

CYCLE 6

(It is assumed that fresh data is available on line 18).

Tally Store 20: Shift data on line 18 by way of field 25*a* and the shift table to field 25*b*. At the same time shift the data in field 25*b* to field 25*c*.

Data Store 10: No operation.

Comment: The data in fields 25*b* and 25*c* is also available in fields 15*b* and 15*c*.

CYCLE 7

(It is assumed that fresh data is available on line 18).

Tally Store 20: No operation.

Data Store 10: Search on device number and load flag.

Write data from fields 15*a* to 15*c* into word register.

THE STORE OF FIG. 5

FIG. 5 shows the system of FIG. 2 adapted to allow for the allotment of new buffers to devices when a first buffer has been filled. For the same features, the same references are used in FIGS. 2 and 5. For ease of description, a filled buffer will be called a data block. As in the system of FIG. 2, eight word registers are the maximum number allotted to a buffer so a data block consists of eight word registers. As a specific example, the buffer system to be described connects a CPU to a plurality of telecommunication terminals distinguished by different identifiers. Data flowing from terminals to CPU is input data, while data flowing from CPU to terminals is output data. Data is transferred between the CPU and the buffer system as data blocks and not as individual words, whereas data is transferred between the terminals and the buffer system as individual words.

On input, data from the terminals is assembled in buffers, one buffer to each active terminal, just as in the system of FIG. 2. When a buffer is full it is changed in status to an input interface buffer and becomes a data block. This merely involves changing the values of certain status bits associated with the data. The data clock is given a block sequence number and a request is added to the input request list. Blocks are transferred to the CPU, normally in order of request, although an optional priority scheme will be described. When a block has been transferred, the word registers are returned to the free list.

An output, in response to an output request on an output request list, a data block is transferred to the buffer system together with the indentification of the terminal for which it is intended. The output request is removed from the request list and each word of data in the block, now an output buffer, is transferred to the terminal; the word register is returned to the free list.

The major difference between the systems of FIGS. 2 and 5 is the extension of the control field, 35 in FIG. 5, of the data store. Field 35 now consists of five bits. The two right-most bits are the load and unload flags already described. The remaining three bits indicate the different statuses of the word registers with which they are associated, as follows:

- 000 indicates that the data belongs to an input interface buffer;
- 001 indicates that the data belongs to an output interface buffer;
- 010 or 011 indicates that the data belongs to an incomplete buffer;
- 100 indicates that the word register holds data relating to the input request list;
- 101 indicates that the word register holds data relating to the output request list; and,
- 110 or 111 indicates that the word register belongs to the free list.

The field corresponding to field 35 in the tally store 20 is field 36.

Besides holding data, data store 10 has the function of holding the input request list and the output request list 38. Tally store 20, besides holding the sequence increment table 30 (details not shown) and the tally increment table 32 (shown as a shortened form of the table 32 of FIG. 2), also holds an input tally pair 39, an output tally pair 40, and a load, unload tally pair 41. The load, unload tally pair are used in the same way as the load and unload tallys described with reference to FIG. 2. The other tally pairs each comprise a load and unload tally. Also in tally store 20 is a shift table 42, used for shifting data between data field 25*b* and identifier field 23.

Considering in more detail data input, when a completed input buffer is detected (sequence numbers equal and unload flag present), an extra word (besides the word required for the data) is taken from the free list using the load tally of pair 41. The terminal identifier in field 13 of the buffer is shifted by table 42 into the field 15*b*. Simultaneously, the input load tally of pair 39 is read to field 23 of the tally store. The input load tally is written into field 13, the terminal identifier into field 15*b* and 1 00 00 into control field 35 of the data store thus constructing a word like word 37. Finally, in the data store, the input load tally is written into field 13 of all words of the full data buffer together with 000 into the left three columns of field 35. This changes the full input buffer into a data block. The operation is completed by incrementing the input load tally in the tally store.

The loading of another item of data from the terminal with the associated data block is done as described for the system of FIG. 2 using the load tally of the tally pair 41 to select a word register on the free list to open a new buffer for the terminal. The left-hand three bits of control field 35 will be set to 010 or 011.

Fig. 5 shows an example of input data block 43. It is assumed that this is the first block and thus holds an identifier 0000 0000. Associated with the block is input request word 37 which holds the block identifier and, in field 25*b*, the identifier of the terminal from which the data came. To select a data block external control reads the input unload tally of tally pair 39 and compares it to the input load tally. If they are equal, a block is not present in the data store. If they are unequal, a search is made for the request word with identifier equal to the input unload tally. This provides external control with the terminal identifier. Then the words of the block are successively unloaded as described with reference to FIG. 2, using the input unload tally as the identifier. The operation concludes with the incrementing of the input unload tally. Unloading of data blocks is a semi-continuous process, external control repeatedly testing the input tallys to see if a block is to be unloaded.

A variation of the above procedure is to use part of the data field of the last word of a data block to hold the data field of the last word of a data block to hold the terminal identifier. This saves a word from the free list but means that a data block contains slightly less data.

Output, that is, data transfer from CPU to a terminal, is similar to input. In the usual way, the CPU tells the terminal that it has data ready for transfer. The terminal presents the terminal identifier to the buffer system over line 17 and an output request, such as word 38, is added to the list by selecting a word register from the free list using the load tally, reading the output load tally from tally pair 40 and placing it in the identifier field 13 meanwhile shifting the terminal identifier to field 15b, and writing the word so formed into the register taken from the free list. The left most bits of field 35 of the request word are 101. Finally, the output load tally is incremented.

At any time there may be several such request words in the data store, ordered by their output load tally numbers. External control is, as for input requests, constantly trying to clear the output request list. This it does by reading the output unload tally from the tally store. If the output unload tally is not equal to the output load tally, it selects, by means of the output unload tally, the output request word in the data store to obtain the terminal identifier. Using this identifier the CPU transfers the data block to the buffer system as described for FIG. 2. The terminal identifier is used in field 13. Finally, the request word is returned to the free list. If there is no data block for the same terminal already in the data store, data can then be transferred to the terminal by the unload sequence previously described, after changing the left most bits of field 35 to 010. If there is a data block already in the data store, these bits are 001, and the data in the block is not yet available to the terminal.

The input request list can be modified to take account of data transfers of differing priority. For each grade of priority there is provided a respective input tally pair, different pairs being distinguished by different high order bits. Input tally pairs are examined and processed in order of priority, highest priority first. Thus, input data block transfer takes place until the highest priority input load tally equals the highest priority input unload tally, after which the next highest priority tally pair are examined. Priority could be automatically assigned in accordance either with the data source, in which case the terminal identifier could contain bits which are priority significant, or its data content, in which case certain words could be recognized as giving the message priority.

OTHER EMBODIMENTS

Modifications of the embodiments described falling within the scope of the appended claims will suggest themselves to those skilled in the art. For example, the tally store could be dispensed with, the tally and sequence numbers being held in registers and incremented by an add-one adder. Adaptation of the buffers to last-in, first-out operation is readily effected by selecting the word with the load marker for unloading, and by transferring the load marker to the word with the next lower order sequence number.

The main advantages of a data storage system according to the preferred embodiments reside in the ease with which it is manufactured, especially in monolithic circuitry, since the structure of a store is very regular and can be implemented with very few different integrated circuit chip types, and in the ease with which the system can be adapted to different applications. The maximum number of words in a buffer is at the choice of the system microprogrammer and is not determined by hardware. It is envisaged that, with very little complication in control, different maximum size buffers could be assigned to different devices. In the second embodiment, priorities are at choice and can easily be changed in the light of operating experience.

In addition, various components of the system can be implemented in nonassociative stores using nonassociative searching or by using hybrid associative techniques such as disclosed in U.S. Pat. No. 3,644,906, entitled "Hybrid Associative Memory," assigneed to the assignee of this invention, or by conventional nonassociative addressing using data significant addresses as disclosed in the IBM Technical Disclosure Bulletin, Vol. 11, No. 9, February 1969, Pages 1,160–61, entitled "Two-Way Mapping Device."

What is claimed is:

1. A storage system comprising, a store having a plurality of register locations for storing data words, each of said registers having a data field, a user identifier field, a user sequence number field and a control field including a bit position for identifying for each user, a next location in said store to be addressed for unloading data, means providing a multi bit identifier for a designated user for searching in said bit position identifying the next location in said store for addressing the next data entry for said designated user and the associated sequence number, and means responsive to the sequence number of the addressed location for generating a next number in a cyclic number sequence for locating said next entry in said store and updating said identifying bit positions to identify the next location to be unloaded.

2. The system of claim 1 wherein said next location to be unloaded is the first entered of the data entries of a user and said system further includes a bit position in said control field for identifying for each user a last data entry, means operable during a data entry operation to access the sequence number field of the last entry of a user, form an incremented sequence number, and store the incremented sequence number with the data being entered, and means to update said bit position in said control field for identifying to identify the register storing said last sequence number.

3. The system of claim 2 wherein said number sequence is of a predetermined length defining a buffer in said store whereby the double occurrence of a sequence number signifies that a buffer is full, and said system further includes means to identify said double occurrence.

4. The system of claim 3 wherein said store is an associative array of storage elements.

5. The system of claim 4 wherein said means to generate said sequence numbers comprises a storage array storing a sequence number in a location addressable from the preceding number in the sequence.

6. The system of claim 2 wherein said control field for each register of said store includes a bit position designating the register as busy or vacant and said system further includes, means for generating a second number sequence equal in length to the number of registers in said store, and means for storing the sequence number of the next of said registers to be addressed in a data entry operation.

7. The system of claim 6 further including means for storing the second sequence number of a next of said registers to be unloaded.

8. The system of claim 7 wherein said means for generating said second sequence comprises a table addressable by a predetermined starting number or by a current load or unload number to identify either a single next number in said sequence or a plurality of single numbers and forming the next number of the sequence as the logical sum of said identified plurality of numbers.

9. The system of claim 8 wherein the means for generating said second number sequence comprises an array of four state associative storage cells having means to read register locations that are next in a predetermined sequence to a register matched during a search, whereby each number in the sequence identifies one or more next registers holding the next number of the sequence.

* * * * *